Figure 1:
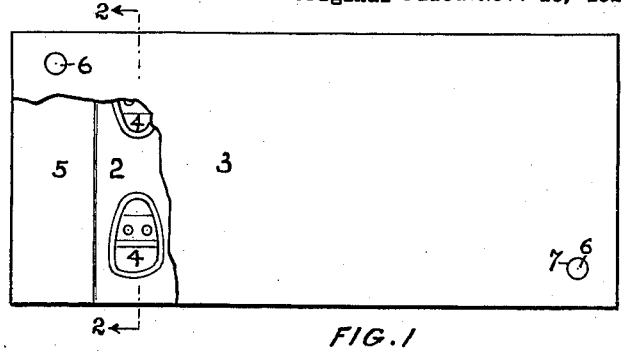

July 28, 1925.

G. W. CLAPP 1,547,643

METHOD AND MEANS FOR MOLDING ARTIFICIAL TEETH

Original Filed Nov. 16, 1923    2 Sheets-Sheet 1

Inventor
George Wood Clapp.
By
Attorney.

July 28, 1925.  1,547,643

G. W. CLAPP

METHOD AND MEANS FOR MOLDING ARTIFICIAL TEETH

Original Filed Nov. 16, 1923   2 Sheets-Sheet 2

Inventor
George Wood Clapp.
By
Attorney.

Patented July 28, 1925.

1,547,643

UNITED STATES PATENT OFFICE.

GEORGE WOOD CLAPP, OF NEW ROCHELLE, NEW YORK, ASSIGNOR TO THE DENTISTS' SUPPLY COMPANY, A CORPORATION OF NEW YORK.

METHOD AND MEANS FOR MOLDING ARTIFICIAL TEETH.

Application filed November 16, 1923, Serial No. 675,050. Renewed June 12, 1925.

*To all whom it may concern:*

Be it known that I, GEORGE WOOD CLAPP, a citizen of the United States, and resident of New Rochelle, county of Westchester, and State of New York, have invented an Improvement in Methods and Means for Molding Artificial Teeth, of which the following is a specification.

The object of my invention is to provide a method and means for accurately proportioning and positioning the bisque or porcelain producing materials entering into the make-up of artificial teeth, whereby the shade or coloring of the tooth structure, and especially at the labial or buccal portions thereof, will have a more natural appearance and a uniformity of reproduction; and further, insuring that the shading or coloring will always be the same in teeth made with the same molds.

Heretofore, it has been customary, in molding the porcelain material for the making of artificial teeth, to employ a two-part mold, one part having a recess corresponding to the labial or buccal portion of the tooth and the other having a recess corresponding to the lingual portion thereof, in the former of which the porcelain producing materials for molding the enamel at the incisal and labial (or buccal) portions of the tooth were inserted by hand operation in a more or less irregular manner and proportion, and in the latter of which mold parts the body or backing material (usually darker) from which the back or lingual portion and, in some cases, the upper part of the labial or buccal portions of the tooth are composed, were similarly inserted by hand operation; the mold parts, when thus loaded, being pressed together to bring the enamel and body porcelain materials into association and contact to jointly fill the entire tooth space to complete the molding of the tooth preliminary to its being biscuited and finally vitrified into porcelain. In operations of this kind, where the judgment of the worker is required to come into play to insure the proportions and relative positions of the enamel and body materials, it is manifest that a great irregularity will necessarily occur, and thereby produce teeth varying in the shade or color effect on the labial (or the buccal) surfaces. This not only requires special sorting of the finished teeth to provide approximately uniform classification, but many of the teeth are not consistent with the definite shade guides in use and, therefore, are considered as defective in that respect. By the employment of the improvements embodied in my invention, this uncertainty and irregularity in the coloring or shading of the teeth may be entirely overcome; and all of the teeth made in a mold embodying my invention are accurately duplicated as to structure and shade or color by merely insuring that the porcelain materials employed are such as to produce the right shade or color. Furthermore, the dentist is enabled to insure a more accurate shading and color to the denture to suit the requirements of the patient and may secure this result with a minimum stock of teeth.

The improved method practiced in carrying out my invention comprises the following steps: Assuming that a two-part mold of the ordinary character is to be employed as the main molding apparatus for producing the final configuration of the tooth structure, there is also provided a third mold part which is specially constructed to fit more or less into or in association with the recess of one of the parts of the two-part mold, said third mold part being of such shape that its molding surface gradually approaches, from one end to the other, the general molding surface of the mold recess of the aforesaid two-part mold portion, forming a mold space less than the tooth space provided by the two-part mold, whereby there is molded a portion only of the tooth, the excess of the body material in plastic condition being squeezed out and that which remains being compressed into the proper shape for the body and cervical end of the tooth; and thereafter, with or without drying of the molded material, removing the third mold part and completing the molding of the tooth by placing in the other mold part of the two-part mold the balance of the porcelain material having the requisite shade or color necessary for completing the molding of the tooth with the two-part mold.

My invention, as herein defined, may be further characterized by so forming the third mold part that it may cooperate with either the lingual recess of one mold part or the labial or buccal recess of the other mold part in the preliminary molding operation, as may be desired, but I prefer that the third mold part shall be shaped to cooperate with the mold part of the two-part mold which molds the lingual portion of the molded tooth.

In that practice of my invention, wherein the third mold part is adapted to mold the lingual or body portion in the preliminary molding step, said mold part has a molding recess of less depth than that of the corresponding portion of the two-part mold and also has a portion adjacent the incisal end which extends outward beyond the junction plane or line of contact of the normal two-part mold portions and so that the molding surface of this third mold part, in assembled relation with the mold part having the lingual recess, gradually approaches the general surface of said recess whereby, when the said third mold part is substituted by the second part of the two-part mold, there will be provided a space between the metal of the mold and the molded porcelain material, which space is of gradual increasing width in a lingual-labial direction from the cervical end to the incisal end; and after the utilization of said third mold part, it is substituted by the normal second mold part and the molding therewith of the porcelain material which is to constitute the enamel, from the incisal end toward the cervical end, all of which is preliminary to final vitrifying of the molded or bisque tooth. As a modification of my invention, the third mold part may be so constructed that it fits more or less into the labial or buccal recess of one portion of the two-part mold, said third mold part being in such shape that its operative surface approaches the upper or cervical end of the recess and gradually recedes from the surface adjacent to the lower end or the incisal part of the tooth, so as to leave at this portion of the mold a shallow space of gradually decreasing thickness from the incisal end. In operation, the enamel (usually of porcelain material of lighter shade) is introduced in a plastic state into the recess of the labial or buccal portion of the mold space and in greater quantity toward the incisal end thereof, and thereupon the third mold part is introduced and forced under pressure in close contact, so that it shall provide a displacing action which squeezes out all of the excess of the plastic porcelain material and causing that which remains in the cavity or space between the mold parts to be compressed into the proper shape for the incisal portion of the tooth and extending upwardly along the labial or buccal surface with a gradually decreasing thickness, and more or less entirely omitted as desired from the median portion or thereabouts to the cervical end. In this manner, the quantity and shaping of the enamel or porcelain material is accurately assured, and adapted to provide the labial or buccal covering for the body material. The body material which also constitutes the back or lingual portion of the tooth may be made of the same general porcelain material with proper coloring oxides to insure the shade desired and so as to make a proper contrast with the material employed for the incisal end and adjacent labial or buccal part of the tooth structure, as above stated; and said body material having been previously introduced into the other half of the two-part mold, namely, into the recess thereof which corresponds to the back or lingual side of the tooth and in sufficient quantity, that when the two parts of the two-part mold are pressed together, the body material of one part will be caused to fill all of the mold space between the two parts which is not to be occupied by the lighter colored porcelain material already in position.

The bisque tooth, when being molded, in the foregoing manner, will involve two definite and positive molding operations, one to first mold a quantity and shape of porcelain material of one shade for making one portion of the final tooth, and the other to definitely mold the quantity and shape of porcelain material of another shade to complete the shape of the tooth, thereby insuring definite relative shapes and proportions of the light and dark shade porcelain materials, whereby the teeth made in the same mold structures will always be the same in appearance and shade effect so long as the definite relative positions and proportions of the two materials are maintained.

My improved process in its broader scope may be briefly stated as consisting of a method for making artificial teeth which consists in first molding a portion of the tooth structure from porcelain material between hard surfaces to insure compression and definite shape and thereafter molding between a hard surface on the one part and the surface of the first molded material on the other part the balance of the porcelain material required to constitute the complete tooth structure, and finally subjecting the composite molded structure to heat to vitrify the two molded parts into a unitary porcelain tooth structure.

Figure 2:
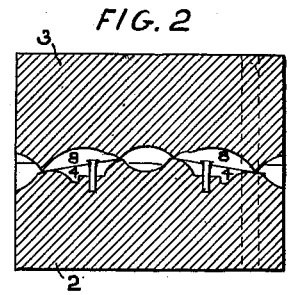
Figure 4:
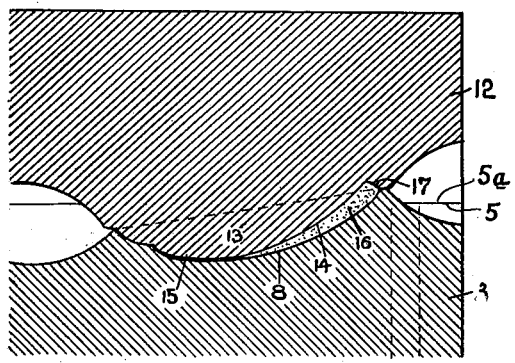
Figure 3:
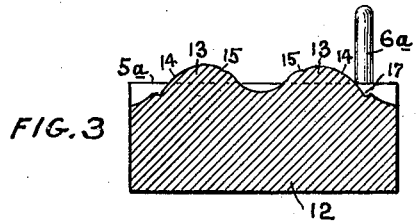
Figures 6, 11:
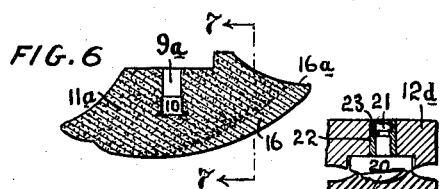
Figure 7:
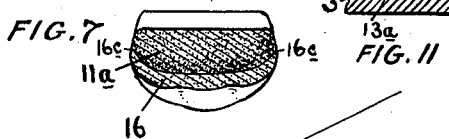
Figure 8:
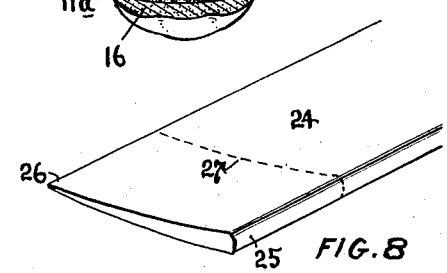
Figure 5:
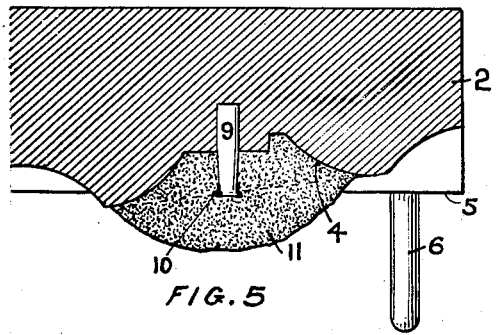
Figure 9:
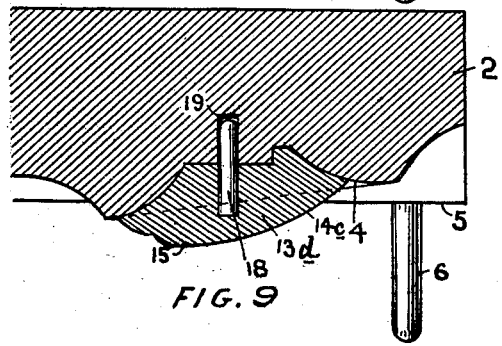
Figure 10:
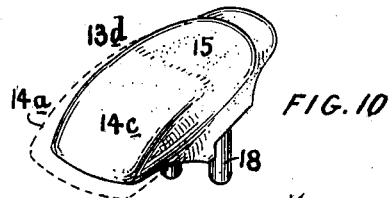
Figure 3A:
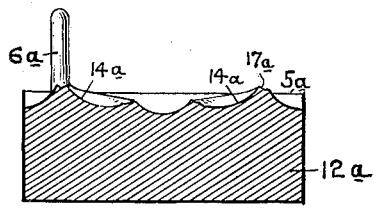
Figure 4A:
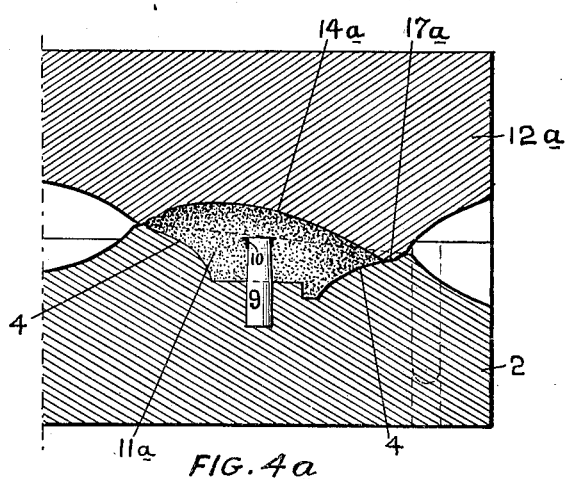
Figure 5A:
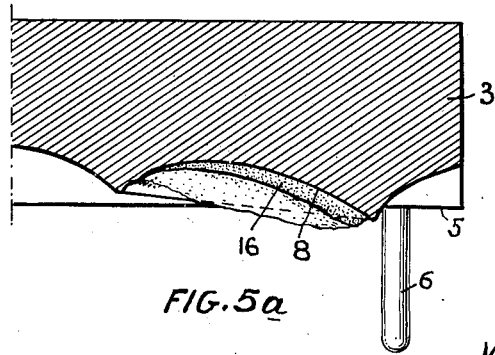

My invention will be better understood by reference to the drawings, in which:

Fig. 1 is a plan view of a two-part mold with a portion broken away and adapted for use in carrying on my improved process; Fig. 2 is a transverse section of the same on line 2—2; Figs. 3 and 3ª are transverse sections of mold parts to be respectively used in the process alternately with one or the other of the parts of the two-part mold shown in Figs. 1 and 2; Figs. 4 and 4ª illustrate, on a large scale, the employment of the mold parts shown in Figs. 3 and 3ª, each with one of the respective mold parts shown in Fig. 2, in act of molding porcelain material; Figs. 5 and 5ᵃ are enlarged views of portions of the respective mold parts of Fig. 2 with porcelain material applied thereto; Fig. 6 is a longitudinal sectional view of an artificial tooth made by my improved method and mold by way of example of a product produced thereby; Fig. 7 is a transverse section of the same on line 7—7 of Fig. 6; Fig. 8 is a perspective view of a strip of pliable porcelain material compound adapted for use in connection with the dies shown in Figs. 4 or 4ᵃ; Fig. 9 is a sectional view of the mold part shown in Fig. 5, with detachable portions which, when applied, give the molding surfaces the characteristics of the mold part shown in Fig. 3 and upper portion of Fig. 4; Fig. 10 is a perspective view of the removable mold part shown in Fig. 9; and Fig. 11 is a modification of the mold part shown in Fig. 9.

2 and 3 are mold parts of an ordinary two-part mold, such as employed in the manufacture of artificial teeth. In general, the part 2 is provided with a plurality of depressions 4 which correspond to the lingual or back portion of the tooth to be molded; and the mold part 3 is similarly provided with a plurality of depressions 8 which correspond to and are adapted to mold the labial or buccal portions of the artificial teeth. These mold parts 2 and 3 usually are formed for molding several teeth at one time, but this is immaterial so far as the nature of my invention is concerned. The two mold parts 2 and 3 are accurately coupled by pins 6 and sockets or holes 7, so that when they are placed together the recesses 4 and 8 are opposed to form the tooth space and the marginal edges cooperate to clearly define the boundaries of the tooth. To prevent injury to the bounding edges of the molding portions, flat surfaces 5 are provided at each end which limit the pressure of the contacting edges about the mold recesses. In the ordinary use of a mold of this character, the light shade porcelain material in a plastic state is introduced by hand into the recess 8 of the mold part 3 and more particularly toward the incisal end thereof, and similarly, the darker colored porcelain body material, also in a paste condition, is introduced by hand into the recess 4 of the mold part 2, and in this latter case, with the greater portion thereof adjacent to the back and cervical end of the tooth space. When the mold parts are then placed together, the plastic porcelain material 11 of the two mold parts come into contact and the excess is squeezed out and, in this manner, the lighter shade porcelain material is in a more or less irregular manner, as to position and quantity, found in the biscuited tooth at the frontal and incisal end. The shade produced by the blending of the light and dark porcelain materials is more or less irregular in the different teeth molded because of the uncertainty in the thickness and disposition of the porcelain material when being applied to the mold. These difficulties are entirely overcome in the practice of my method and with the use of my modified mold parts.

As before stated, the third mold part to be employed with one or the other of the ordinary or usual parts of the two-part mold to perform the first molding step, may be shaped to conform with the requirements of either part 2 or 3 of the mold structure Fig. 2. If the third mold part is to conform to and cooperate with part 3 for such preliminary molding, then Figs. 3, 4, and 5 of the drawings will apply; but if it is to conform to and cooperate with mold part 2 for such preliminary molding, then Figs. 3ᵃ, 4ᵃ and 5ᵃ of the drawings will apply. Considering the first of these cases: In addition to the ordinary mold parts shown in Figs. 1 and 2, I provide an additional mold part 12, a temporary substitute for mold part 2, but having its cooperating surface provided with raised portions 13 in place of the depressed portions 4 (Fig. 3); but otherwise, the general form of the mold part 12 corresponds to the part 2 in that it is provided with flat surfaces 5ᵃ, a pin 6ᵃ at one end, and a corresponding hole 7 at the other end, and moreover, with portions surrounding the raised parts 13 which provide a juncture with the bounding edges of the recesses 8, so as to insure an accurate cooperation of the mold part 12 with the mold parts 3, as more fully and clearly indicated in Fig. 4. Referring to Fig. 4, it will be seen that the projection 13 is shaped at its end 15 to approach the cervical end of the depression 8 in the mold part 3, so that very little bisque material would be molded between these parts. The projection 13 is, however, reduced in size toward the incisal end, as at 14, so as to leave a tapering space between said surface 14 and the surface at the incisal end of the recess 8 in which the light colored or enamel material 16 is molded. Furthermore, at the incisal end of the mold part 13, there is a depression 17 which not only gives the depth to the mold space, but insures a proper thickness of the light shade porcelain or enamel material at the extreme incisal end of the tooth which is finally molded. By introducing the enamel material in a sufficiently plastic state and subjecting the mold parts 3 and 12 to sufficient pressure, accurate shaping of the enamel material to the mold in definite quantity, thickness and taper is insured with each and every tooth molded in the same molds. It will be understood that, by introducing the porcelain material between the mold parts 3 and 12 in any suitable manner, the excess thereof may be squeezed out so that only the proportion required as at 16 remains, and the thickness of this material will be positively assured and repeated in each tooth molded. While the enamel material 16 may be inserted by hand operation, it may, however, be introduced in any other way, and by way of illustration, reference is made to Fig. 8 in which a very thin tapered strip 24 of the material may be made as a preliminary operation and rolled into lozenge-like portions by transverse cuts 27, giving to each piece a thick end 25 and a thin end 26 of wedge-like character, said wedge-like pieces being laid in the tooth spaces 8 adjacent to the incisal end before the application of pressure by the mold part 12. This wedge shaped piece, in practice, would be of quite pliable nature, but being of approximately the right thickness, the amount of displacement by the action of the molding parts 3 and 12 may be reduced to a minimum.

After the lighter shade or enamel material 16 is molded in the recess 8 of the mold part 3, it may be dried by heating the mold parts before separation. The mold part 12 is then removed and the mold part 3 with the enamel portion 16 is then ready for receiving the back or body porcelain material, usually of darker shade. This body material is indicated at 11, in Fig. 5, and is introduced into the recess 4 of the mold part 2 by hand or in any other suitable way, being preferably in somewhat greater quantity toward the cervical end than the incisal end. During this operation, the said body material may be molded about one or more anchors 10 carried upon posts 9, in the usual way, for the purpose of providing the tooth with embedded anchors and holes leading thereto when it is desired to provide the finished tooth with pins soldered in position. This particular provision of anchors is no part of my present invention and it will be understood that instead of employing anchors for soldered pins, the pins may be directly molded in the porcelain material without the usual separate anchors, just as if the post 9 and anchor 10 were integral and constituted the pin in the finished tooth. It will also be understood that the tooth may be devoid of anchors or pins and have depressions or holes of various shapes alone molded in them. When the mold part 2 has been provided with the necessary quantity of body material, it is placed in operative position upon the mold part 3, as in Fig. 2, and upon proper pressure being applied, the body material 11 will fill all of the tooth space between the mold parts 2 and 3 that is not already filled with the enamel material 16, the excess of the body material being squeezed out from between the mold parts in the usual way. When the materials are thus molded, the same is baked by heating the mold while the two parts are clamped together, and finally the biscuited tooth is removed from the mold and is in the form shown in Figs. 6 and 7. In these figures, it will be seen that the incisal end 16$^a$ has the light enamel material extending upward upon the lingual side as well as the labial side to give the more or less transparency required. The body 11$^a$ of the tooth is usually composed of the darker material and this extends to or nearly to the labial or frontal surface adjacent to the cervical end to the diminishment of all other lighter shade material 16, inasmuch as the lighter shade material tapers off and in some teeth may terminate at or near the median labial or frontal portion of the tooth. It will be seen also that the anchor elements 10 are embedded in the body material and holes 9$^a$ for the introduction of the pin provided. The biscuited tooth is now in condition for being vitrified and it is subjected to the requisite temperature for converting the material into porcelain and, during this operation, the two porcelain materials 16 and 11$^a$ fuse and blend so that the coloring matter of the usually darker body material 11$^a$ blends into the usual lighter shade material 16. In the drawings, Figs. 6 and 7, the actual blending under the vitrifying action is not illustrated with any attempt at accuracy, because these figures represent the bisque before it is vitrified and are intended more particularly to show the relative arrangements of the light and dark shade materials in the molded tooth before vitrification, and to which my invention more particularly is directed.

Considering now the case wherein the first molding step is in forming the body or lingual part of the tooth and involving use of the mold parts shown in Figs. 3$^a$, 4$^a$ and 5$^a$: The operation or method in this case is in general the same as that above described in connection with the mold parts shown in Figs. 3, 4 and 5 and, therefore, much that has been stated will not have to be repeated here. Mold part 12$^a$ has its molding surfaces mostly recessed instead of being raised above the parting plane, but this recessed portion 14$^a$ is of less depth than in mold part 3, and at the incisal end the boundaries of the recessed portion project above the parting plane as at 17$^a$ so as to extend into the recess 4 of the mold part 2, all as shown in Fig. 4$^a$. This produces in the final tooth, the same result as the provision of the part 17 in the mold part 12. When the parts 12$^a$ and 2 are placed together, as in Fig. 4$^a$, a mold space for the body material 11$^a$ of large size is provided, instead of a small size space 16 for the enamel material, as in Fig. 4, and hence the body material thus molded will retain its shape and position when given the preliminary drying. It will be seen from Fig. 4$^a$, that no frail or delicate portions are formed in thus molding the body and lingual sides of the tooth. For a better understanding, it may be said that the surface 14ª of the recess in mold part 12ª corresponds to or is coincident with the molding surface 14 of mold part 12 of Fig. 4, and for this reason the final union between the tooth portions 11ª and 16 (Figs. 6 and 7) will be the same; the tooth structure produced by the use of these mold parts Figs. 3ª, 4ª and 5ª and the order of use will be precisely the same as in the use of the mold parts Figs. 3, 4 and 5, first described, but the care required in carrying out the method is less and hence the use of said parts Figs. 3ª, 4ª and 5ª are preferable. It will be understood that after the body material is properly molded in mold part 2 by use of mold part 12ª (Fig. 4ª) and dried, the latter mold part is removed and mold part 2 with the biscuited body portion 11ª is employed with mold part 3 after it has received the requisite enamel material 16, as indicated in Fig. 5ª, and by compression and drying, the complete biscuited tooth, Figs. 6 and 7, is produced. It will be observed that in this procedure the enamel material 16 is so molded that it extends to the approximal surfaces of the tooth as shown at 16ᶜ (Fig. 7). The biscuited tooth is finally vitrified as before described.

As a convenience in making the molds adapted for molding the enamel material 16, as shown in Fig. 4, the mold part 12 may have its projecting portions 13 formed on separate blocks 20, as indicated at 13ª (Fig. 11). If so desired, these blocks may then be positioned upon the mold part 3, and finally a mold part body 12ᵈ having holes 22 therein may be placed over and upon the blocks 20 and attached thereto by introducing solder or other metal 23 into the holes 22 and about projecting pins 21 extending upwardly into the holes from the blocks 20. In this manner, the mold structure 12 may be built up with less expense than where all of the different projecting portions 13 are required to accurately fit the depressions 8 of the mold part 3. In following the construction illustrated in Fig. 11, it is manifest that any variation in shrinkage would in no way interfere with the proper positioning of the blocks 20 and projecting mold surfaces 13ª in respect to the recesses of the mold part 3, because all parts would be in proper final position before the solder or binding metal 13 was applied. It will also be understood that instead of making a separate or third mold part 12, to be used with the mold part 3 as a substitute for the mold part 2 during the preliminary operation of molding the light shade or enamel material, the mold part 2 may be utilized for both the preliminary and final molding operation by providing its depression 4 with removable die blocks 13ᵈ (Fig. 9), in which the cervical end 15 approaches the cervical end of the recess 8 and the incisal end 14ᶜ corresponds to the surface 14 of the mold part 12 before described. In this case, the blocks 13ᵈ are provided with pins 18 which fit holes 19 in mold part 2 which holes may subsequently receive the posts 9 for carrying the anchors, as shown in Fig. 5. In this manner, the blocks 13ᵈ may be placed in the mold part 2 when molding the enamel material 16; and thereafter the blocks 13ᵈ are removed, the posts and anchors introduced, and the bisque material 11 placed in position, all as indicated in Fig. 5, and then employed in connection with the mold part 3, which already contains the lighter colored bisque material 15 and the biscuited tooth formed thereby, as before. One of these removable mold blocks 13ᵈ is illustrated in Fig. 10, when removed from the mold part 2, and the dotted line 14ª thereof is intended to illustrate what would be the full shape of the biscuited tooth, which would finally result from the mold parts 2 and 3 when employing such a mold block in the preliminary step. For the purposes of my invention, in so far as defining the combination between the two parts 3 and 13 for the preliminary molding of the enamel part 16 of the tooth, the operative surfaces of the part 12 do not differ from the operative surfaces of the construction shown in Fig. 9, and, therefore, in a broad sense, I deem these as equivalents, and the same will also hold true in connection with the modification shown in Fig. 11.

What has been stated with respect to the mold structures of Figs. 9 and 11, in regard to cooperation with the mold part 3, will equally apply to corresponding structural features when adapted for cooperation with mold part 2 and it will not be necessary to duplicate these Figs. 9, 10 and 11 to further elaborate upon this statement, especially as the particular shapes of the tooth mold recesses are not to be considered as limitations of my invention.

While my invention is in no wise confined to the composition of the material to be molded, nevertheless, it is more particularly intended to be employed in connection with porcelain producing material as used in artificial teeth manufacture. In a general way, said materials may be stated as composed of feldspar, kaolin and silex, excepting for the coloring metallic oxides employed in the two parts for providing the desired shades, the said materials being made into a plastic condition with a suitable binder which will enable the mineral substances to retain their molded shape in forming the biscuited teeth.

In this application no claim is made to the tooth structure shown in Figs. 6 and 7, as said figures are included by way of example of an article of manufacture which may be made by my improved molds and method of molding, and the article therein shown will form subject matter of a divisional application.

I have described my improved method and means in that particularity which I deem to be the best exposition of my invention, and that which I prefer in commercial practice, but I do not restrict or confine myself to the minor or secondary details, as such are susceptible of modification which may be resorted to as matters of mechanical skill and without a departure from the spirit of the invention.

Having now described my invention, what I claim as new and desire to secure by Letters Patent is:

1. The herein described method for making artificial teeth which consists in first molding a portion of the tooth structure from porcelain material between hard surfaces to insure compression and definite shape and thereafter molding between a hard surface on the one part and the surface of the first molded material on the other part the balance of the porcelain material required to constitute the complete tooth structure, and finally subjecting the composite molded structure to heat to vitrify the two molded parts into a unitary porcelain tooth structure.

2. The invention according to claim 1, wherein further, the two molded portions are made from materials of different shades or color which overlap each other to provide a blending of the materials, whereby the two materials fuse together at their place of contact and the shades or color thereof blend one into the other.

3. The invention according to claim 1, wherein further, the porcelain material first molded is applied in the plastic state and then dried before the molding of the second portion or balance of the porcelain material.

4. The invention according to claim 1, wherein further, the porcelain material first molded is applied in the plastic state and then dried before the molding of the second portion or balance of the porcelain material, and the second part or balance of the porcelain material is also subjected to a drying operation whereby the whole tooth structure is biscuited prior to the final vitrifying of the same.

5. The method according to claim 1, wherein further, the porcelain material first molded is applied in the plastic state and then dried before the molding of the second portion or balance of the porcelain material, and metal anchoring means are embedded in the porcelain material during the molding thereof and prior to the molding of the second molding step.

6. The invention according to claim 1, wherein further, metal anchoring means are embedded in one of the porcelain molded parts during its formation and whereby and by reason of which it is attached to the other molded part when the tooth structure is vitrified.

7. The herein described method of making composite molded objects, which consists in forming the same from separate porcelain materials of respectively different shades or colors by successive molding operations, wherein one molded part is formed from an excess of material of one shade or color as a preliminary operation and shaped with variable thickness by pressure between a plurality of hard cooperating dies, and the excess of material squeezed out and separated, and a second molded part is formed from an excess of the material of another shade or color by being compressed upon the previously molded part and the excess of material squeezed out and separated whereby the second molded part is also shaped with variable thickness, and finally vitrifying the molded object so formed to produce a unitary porcelain structure, wherein the two shades or colors of the materials are definitely blended one into the other producing a greater variety of shades than provided separately by the materials themselves.

8. The herein described method of making artificial teeth which consists in first definitely molding between hard molding surfaces the body and lingual portions including the cervical end of porcelain material of one shade, whereby a definite and variable thickness is assured from near the incisal end toward the cervical end of the tooth and insuring positive compression, and thereafter definitely and accurately molding upon and in close contact with the aforesaid body material a further quantity of porcelain material of a different shade to constitute the enamel at the labial or buccal portion of the tooth having its greatest thickness at the incisal end and gradually reduced in thickness toward the cervical end, and finally vitrifying the tooth thus formed to insure the entire tooth structure becoming a vitrified product with a definite blending of the two shades of porcelain material.

9. The invention according to claim 8, wherein the body material in its molded form is subjected to a drying operation while in custody of the hard molding surfaces, and wherein also the material constituting the second molded operation is dried before subjecting the biscuited tooth structure to the vitrifying operation.

10. Molding devices for use in preliminary molding of artificial teeth, which consists of a mold part having a recess therein shaped to conform to one portion and surface of a tooth, combined with a second mold part having a molding surface to coact with the molding surface of the first mentioned mold part, said molding surface being nearer to the molding surface of the molding recess of the said first mentioned mold part than is required for the final molded tooth structure, and wherein further, the molding surface of the second mold part is relatively nearer to the incisal surface at one end than to the surface at the other or cervical end and in general curvature approximating the labial surface of the finished tooth to be formed by a final molding by use of a third mold part with the first mentioned mold part.

11. The invention according to claim 10, wherein further the mold recess of the first mentioned mold part is shaped to conform to the lingual side of a tooth and the molding surface of the second mold part meets the lingual surface at a distance from the incisal end of the mold surface of the first mold part and approximates the general shape of the labial surface of a finished tooth but approaching the lingual surface at the incisal end more rapidly than in the finished tooth to be completed by a secondary molding with the use of a third mold part in association with the first mentioned mold part.

12. Molding devices for use in molding artificial teeth which consist of a mold part having a recess therein shaped to conform to the lingual surface of a tooth, combined with a second mold part having a contacting surface to coact with the first mold part, said surface having a molding recessed portion provided with a projecting incisal part which extends into and fits the incisal surface of the recess of the first mold part and having the general molding surface thereof approximating the labial surface of the finished tooth but formed to come gradually closer to the lingual surface of the first mold part more rapidly from the cervical end to the incisal end than would be the case with the labial surface of the finished molded tooth structure to be made by the further use of the first mold part with a third mold part, said second mold part further conforming to the bounding edges of the said molding recess at the incisal end in the first mold part, whereby the porcelain material to be compressed between the first and second mold parts will constitute a tooth form without an incisal end but of a width equal to that of the tooth recess and of a length extending from a short distance from the incisal end to the cervical end of the said tooth recess.

In testimony of which invention, I hereunto set my hand.

GEORGE WOOD CLAPP.